United States Patent
Johnston

(10) Patent No.: US 9,976,676 B2
(45) Date of Patent: May 22, 2018

(54) TUBE FITTING TAMPER-RESISTANT COLLAR

(71) Applicant: Lonnie E. Johnston, Port Charlotte, FL (US)

(72) Inventor: Lonnie E. Johnston, Port Charlotte, FL (US)

( * ) Notice: Subject to any disclaimer, the term of this patent is extended or adjusted under 35 U.S.C. 154(b) by 543 days.

(21) Appl. No.: 14/585,862

(22) Filed: Dec. 30, 2014

(65) Prior Publication Data

US 2016/0377205 A1 Dec. 29, 2016

Related U.S. Application Data

(60) Provisional application No. 61/922,987, filed on Jan. 2, 2014.

(51) Int. Cl.
| | |
|---|---|
| *F16L 15/08* | (2006.01) |
| *F16L 35/00* | (2006.01) |
| *F16L 55/00* | (2006.01) |
| *F16L 19/00* | (2006.01) |

(52) U.S. Cl.
CPC ............. *F16L 15/08* (2013.01); *F16L 19/005* (2013.01); *F16L 35/00* (2013.01); *F16L 55/00* (2013.01)

(58) Field of Classification Search
CPC .................................. F16L 15/08; F16L 35/00
USPC ........................................ 285/80, 93, 45, 404
See application file for complete search history.

(56) References Cited

U.S. PATENT DOCUMENTS

| | | | | |
|---|---|---|---|---|
| 716,204 | A | * | 12/1902 | Waldo ................... F16B 41/005 285/80 |
| 923,164 | A | * | 6/1909 | Glauber .................. F16B 37/14 285/45 |
| 969,981 | A | * | 9/1910 | Renick et al. ........ F16B 41/007 285/80 |
| 1,112,189 | A | * | 9/1914 | Bartholomew ....... F16B 41/007 285/80 |
| 1,154,960 | A | * | 9/1915 | Baruch ................. F16B 41/007 285/80 |
| 1,365,477 | A | * | 1/1921 | Gabriel ................. G01F 15/007 285/80 |
| 1,581,973 | A | * | 4/1926 | Meyer ..................... E03C 1/122 285/404 |
| 1,678,955 | A | * | 7/1928 | Rockenbauer ........ G01F 15/007 285/80 |
| 1,841,318 | A | * | 1/1932 | Earnest ................... F16C 1/262 285/45 |
| 3,009,483 | A | * | 11/1961 | Salustri ..................... F16L 7/00 285/80 |
| 3,284,121 | A | * | 11/1966 | Lyon ........................ F16C 1/08 285/80 |

(Continued)

FOREIGN PATENT DOCUMENTS

FR    1001828 A * 2/1952 .............. F16L 35/00

*Primary Examiner* — David E Bochna

(57) ABSTRACT

A tamper evident assembly is provided for an associated fluid fitting that has a threaded nut that cooperates with a threaded body. The tamper evident assembly includes a collar having a through opening dimensioned for receipt over at least one of the nut and body. A holding mechanism is operatively associated with the collar for movement between (i) a first position that extends radially inward a dimension no less than the through opening, and (ii) a second position extending radially inward that prevents axial removal of the collar over both of the nut and body of the associated fluid fitting.

12 Claims, 4 Drawing Sheets

(56) References Cited

U.S. PATENT DOCUMENTS

| | | | | |
|---|---|---|---|---|
| 3,284,561 | A * | 11/1966 | Clements | F16L 25/01 |
| | | | | 285/404 |
| 3,333,872 | A * | 8/1967 | Crawford, Sr. | F16L 21/08 |
| | | | | 285/404 |
| 3,678,717 | A * | 7/1972 | Eaton | F16L 35/00 |
| | | | | 285/80 |
| 4,358,140 | A * | 11/1982 | Jonsson | F16L 37/1225 |
| | | | | 285/80 |
| 4,407,146 | A * | 10/1983 | Nielsen, Jr. | F16B 41/005 |
| | | | | 285/80 |
| 4,422,675 | A * | 12/1983 | Norris | F02C 7/222 |
| | | | | 285/45 |
| 4,630,456 | A * | 12/1986 | Nielsen, Jr. | F16K 35/10 |
| | | | | 285/80 |
| 4,803,858 | A * | 2/1989 | Parker | F16B 41/005 |
| | | | | 70/178 |
| 4,993,260 | A * | 2/1991 | Bednarz | E03B 7/072 |
| | | | | 285/80 |
| 5,431,453 | A * | 7/1995 | Yamashita | F16L 21/08 |
| | | | | 285/404 |
| 5,806,896 | A * | 9/1998 | Sato | F16L 27/04 |
| | | | | 285/404 |
| 8,106,297 | B1 * | 1/2012 | Kiely | H02G 3/0691 |
| | | | | 285/404 |
| 2009/0021001 | A1 * | 1/2009 | Oh | F16L 19/086 |
| | | | | 285/80 |
| 2009/0302598 | A1 * | 12/2009 | Tsubota | F16L 19/005 |
| | | | | 285/45 |
| 2014/0077490 | A1 * | 3/2014 | Daniels | F16L 19/005 |
| | | | | 285/80 |

* cited by examiner

TUBE FITTING TAMPER-RESISTANT COLLAR

CROSS-REFERENCE TO RELATED APPLICATIONS

This application claims the priority benefit of U.S. provisional application Ser. No. 61/922,987, filed Jan. 2, 2014.

BACKGROUND

Instrument type tube fittings have become widely popular for both industrial and commercial applications. This is due in part to the fact that all that is required is a wrench to install or remove the tube fitting.

Many of these fittings, especially the 316 stainless steel (SS) tube fittings, are used in hazardous applications. Systems using extremely high gas pressures, toxic media, and flammable liquids commonly use these fittings. These fittings are used, for example, in applications such as nuclear power plants, commercial and military aircraft, natural gas vehicles (NGV), shipping, commercial buildings. This list of applications of these fittings is exemplary only and not intended to be limiting.

Unlike threaded pipe fitting systems and welded tubing and pipe systems, the instrument tube fitting has one big potential problem, and that is that the instrument tube fitting can be easily tampered with either accidently or intentionally such as ordinary vandalism or even acts of terror. Unless careful examination or measurement is done, it is difficult to determine if someone has tampered with a tube fitting connection until it is too late. This is a very undesirable and potentially serious situation.

In cases such as the natural gas vehicle industry, many of these systems are easily accessible by the general public and easy to tamper with. All that is needed is a wrench and very quickly someone can loosen a fitting to create a leak, to cause a blowout of the tube fitting that can cause property damage, etc. Every year dozens of fires and explosions are due to these types of fittings being used and the damage done is so severe that usually there is little to no evidence left as to what caused the tube fitting to fail. Since this type of tube fitting is so reliable, the conclusion drawn is that the cause of these problems is due to someone accidentally or intentionally loosening the fitting.

In recent years a new type of tube fitting is being used to compete with instrument type tube fittings that are very difficult to tamper with. They are made from cylindrical components that are swaged under great pressure and cannot be taken apart. These fittings however create problems whenever a system has to be taken apart for service or other needs. Special equipment and skills are needed for their use and they typically require much more space for installation due to the size of the hydraulic tooling needed to install this type of fitting. Their use is very limited as compared to the instrument type tube fitting that is so popular.

Currently there are over 200,000,000 instrument type tube fittings produced every year and nearly half of these are 316 SS or other similar type materials that are mainly used in hazardous situations. The large number of new installations every year makes it abundantly clear that the concern for making these type tube fittings more resistant to tampering is very important.

Thus a need exists to make the instrument type tube fitting more difficult to tamper with, and to provide a tamper-resistant arrangement that makes the instrument type tube fitting more competitive with these new permanent type tube fittings.

SUMMARY

The present disclosure provides a tamper resistant collar that also provides the ability to determine whether the fitting assembly has been tampered with.

Depending upon the required needs, the collar can be made very difficult to remove or it can be designed to be easily removed with special tooling. This eliminates anyone other than the installer from tampering with the tube fitting connection.

A tamper evident assembly is provided for an associated fluid fitting that has a threaded nut that cooperates with a threaded body. The tamper evident assembly includes a collar having a through opening dimensioned for receipt over at least one of the nut and body. A holding mechanism is operatively associated with the collar for movement between (i) a first position that extends radially inward a dimension no less than the through opening, and (ii) a second position extending radially inward that prevents axial removal of the collar over both of the nut and body of the associated fluid fitting.

In one embodiment, the holding mechanism includes at least one tab in the first position that does not extend radially beyond the collar.

The at least one tab does not extend radially inward or radially outward from the collar in the first position.

The at least one tab does not extend radially outward from the collar in the first position.

In one embodiment, the holding mechanism includes a pin that extends radially outward from the collar in the first position, and extends radially inward from the collar in the second position.

The pin is movably mounted to the collar.

The first end of the pin is flush with an outer surface of the collar in the second position.

The pin is dimensioned for receipt in a radial gap located between a body and a nut of a fitting assembly in the second position.

A primary advantage of the disclosure is to limit the ability to tamper with a fitting assembly.

Another advantage of the disclosure relates the simple addition to the fitting assembly.

Still another benefit resides in the ability to quickly and easily install the tamper-resistant assembly.

Other benefits and advantages of the present disclosure will become more apparent from reading and understanding the following detailed description.

DETAILED DESCRIPTION

Figure 1:
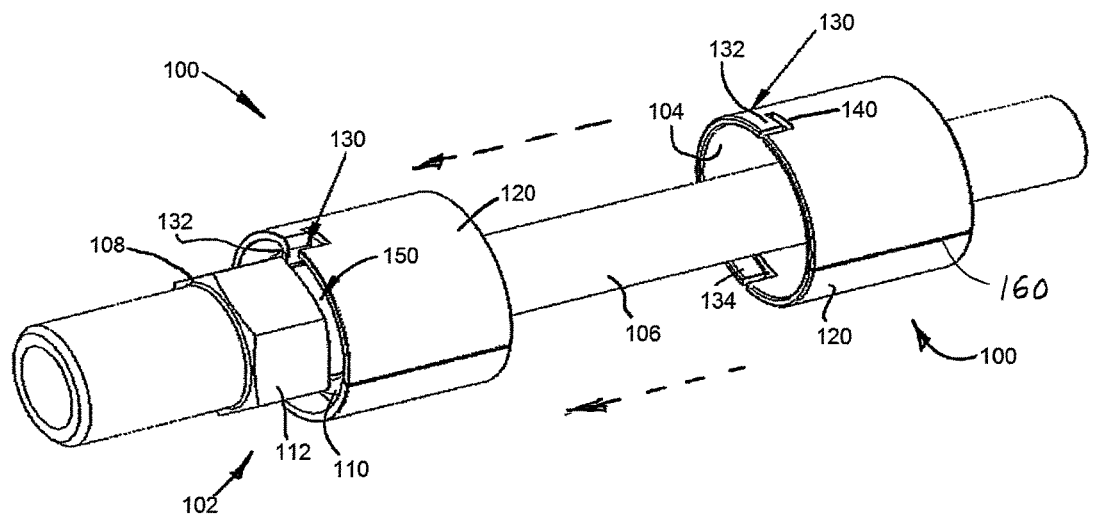
FIG. 1 is a perspective view of a tamper-resistant collar shown in an unassembled state (right-hand portion) and in an assembled state (left-hand portion where it is partially received over a tube fitting assembly).

Turning first to FIG. 1, there is shown a tamper-resistant collar 100 used in connection with a fitting or fitting assembly such as a tube fitting 102. FIG. 1 illustrates the collar 100 in an unassembled state in the right-hand portion of the figure, and in an assembled state in the left-hand portion of the figure where the collar is at least partially received over the fitting assembly 102. The collar 100 is preferably an annular member having an inner surface 104 dimension for receipt over tube 106, and likewise more closely received over at least a portion of the enlarged dimension of a fitting body 108 and a nut 110 of the fitting assembly 102. As is well known in the art, the body 108 and the nut 110 of the fitting assembly 102 include tool engaging surfaces or tool flats 112 adapted to receive a tool (not shown) such as a conventional wrench to allow relative rotation of the nut relative to the body to make up the fitting assembly. For example, a two ferrule design (not shown) is received in the body 108 and upon threaded engagement of the nut 110 relative to the body, the ferrules are axially advanced relative to one another and radially swaged into an external surface of the tube 106. Further details of the fitting assembly are well known to those skilled in the art so that further discussion herein is deemed unnecessary to a full and complete understanding of the present disclosure.

An external surface 120 of the collar 100 preferably does not include any tool engaging surfaces or tool flats 112. The absence of tool engaging surfaces makes it difficult to grip or grasp the collar 100 once the collar is mounted on the fitting assembly 102. The collar 100 further includes a holding mechanism 130. In a first preferred arrangement, the holding mechanism includes one or more portions such as first and second tabs 132, 134 as illustrated in FIG. 1. Two tabs are illustrated and disposed substantially diametrically opposite from one another, although it will be appreciated that a greater or lesser number of tabs could be used or the arrangement of the tabs could also be altered without departing from the scope and intent of the present disclosure. The tabs 132, 134 are formed by cutouts 140 such as L-shaped cutouts in the annular portion of the collar 100. The tabs 132, 134 are originally disposed in and form a continuation of the annular shape of the collar 100 as shown in the right-hand portion of FIG. 1. The collar 100 is advanced at least partially over the fitting assembly 102 (e.g., is moved leftwardly as represented by the broken line arrows in FIG. 1) for at least partial receipt over the fitting assembly, and in this particular instance for receipt over the nut 110 of the fitting assembly. The inner surface 104 of the collar 100 is dimensioned to be no less than an outermost dimensional extent of the nut 110 so that the collar can be axially received over the nut. In some instances, the collar 100 may also be received over the body 108 of the fitting assembly 102 as will be shown and described further below.

Once the collar 100 is positioned at a desired axial location, the holding mechanism 130, defined for example by the first and second tabs 132, 134 in this embodiment, is modified from a first position to a second position. Here, the tabs 132, 134 are bent or deformed radially inward from a first position shown in the right-hand portion of FIG. 1 where the tabs conform to the remainder of the annular shape of the collar 100 to a second position shown in the left-hand portion of the figure where the tabs are bent radially inward for receipt in a radial gap 150 that is axially located between the nut 110 and body 108 of the fitting assembly 102. The tabs 132, 134 are dimensioned so that after being bent radially inward, the collar 100 can no longer be advanced or retracted axially over the fitting assembly 102. Again, and as noted above, in this arrangement shown in FIG. 1, the tabs 132, 134 are located at or near one end of the collar 100 and the collar has an axial dimension sufficient to be at least flush with an end face of the nut 110 that is opposite from the body 108. This assures that the nut 110 is completely covered by the collar 100 in the installed position shown in the left-hand portion of FIG. 1. Once the tabs 132, 134 have been bent inwardly, the collar 100 becomes difficult to remove from the fitting assembly 102. It is contemplated that the collar 100 must be physically deformed or destroyed in order to remove the collar from the fitting assembly 102 once assembled in place, and thus will serve as a tamper-resistant mechanism that is also tamper-evident if access is attempted since such an attempt will likely result in permanent deformation of at least a portion of the collar.

FIG. 1 also shows a seam or slit 160 extending axially along the length of the collar 100. As will be appreciated, one preferred method of forming the collar is to roll-form a stamped flat stock sheet of metal into a cylindrical shape, and opposite edges of the stamped sheet form the seam. Although this is a preferred method of assembly, such does not preclude other methods of forming the collar 100.

Figure 2:
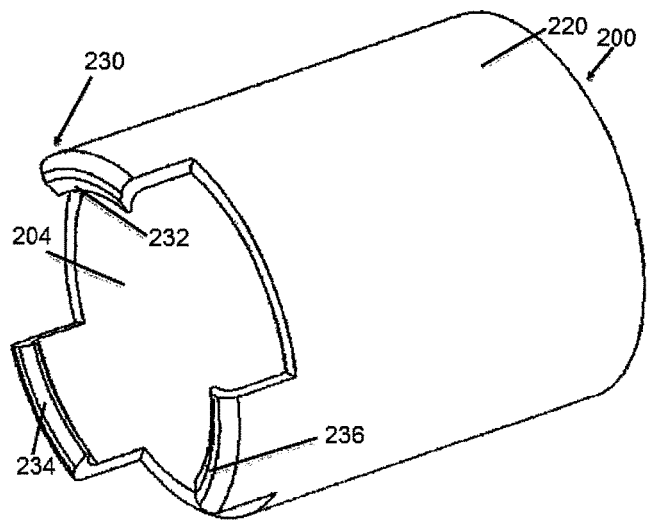
FIG. 2 is a perspective view of an alternative collar.

FIG. 2 is a perspective view of an alternative collar 200. The collar 200 has a generally hollow, cylindrical conformation similar to that shown in connection with FIG. 1 with a smooth inner surface 204 and outer surface 220. The holding mechanism 230 is shown here as three separate tabs 232, 234, 236 located at one end of the collar. The tabs 232, 234, 236 are shown in the deformed or bent state (second position) in FIG. 2 although will be appreciated that in the undeformed state (first position), the tabs extend axially outward from one end of the collar 200 and are substantially aligned with the cylindrical contour of the collar. Once the collar 200 has been axially advanced over at least a portion of the fitting assembly (not shown), namely the nut, the individual tabs 232, 234, 236 are then bent inwardly into the radial gap that is axially located between the nut and body of the fitting assembly. Again, the collar 200 has an axial length sufficient to cover or enclose the corresponding axial length of at least a portion of the fitting assembly, and in this particular design to cover the nut of the fitting assembly.

Figure 3:
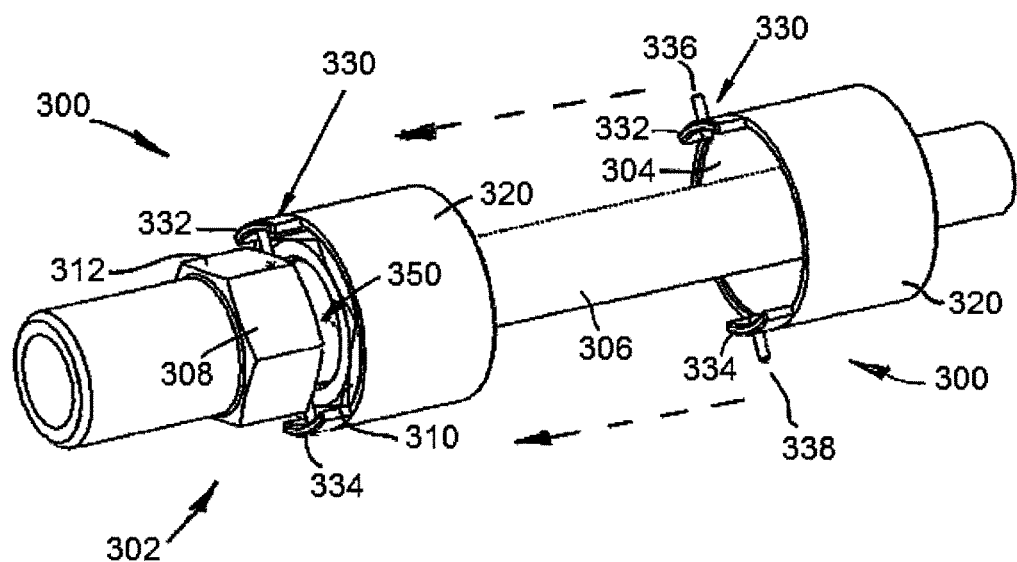
FIG. 3 is a perspective view of another tamper-resistant collar shown in an unassembled state (right-hand portion) and in an assembled state (left-hand portion where it is partially received over a tube fitting assembly).

FIG. 3 shows another embodiment of a tamper-resistant collar 300. Like reference numerals in the 300 series refer to like components. The holding mechanism 330 of the collar 300 in this version includes axially extending tabs 332, 334 that include pins 336, 338, respectively. The pins are pushed radially inward from a first or outer position (right-hand portion of FIG. 3) to the radially inward, locking or second position (left-hand portion of FIG. 3) while in this embodiment, the tabs 332, 334 remain undeformed in the first and second position of the holding mechanism 330. In the radially inward position, the pins 336, 338 are received in the radial gap 350 axially located between the body 308 and the nut 310 of the fitting assembly 302. Again, the collar 300 has an axial length that extends over at least a portion of the fitting assembly 302, and in this particular instance the collar is axially dimensioned to extend over the axial length of the nut 310. As a result, when the collar 300 is advanced into position at least partly over the fitting assembly 302 (i.e., over the nut 310), and the pins 336, 338 pressed radially inward into the holding or second position, access to the fitting assembly 302 is restricted. Since the tabs 332, 334 extend axially outward from the remainder of the collar, there is some limited access to holding mechanism 330, namely the pins 336, 338, in this embodiment.

Figure 4:
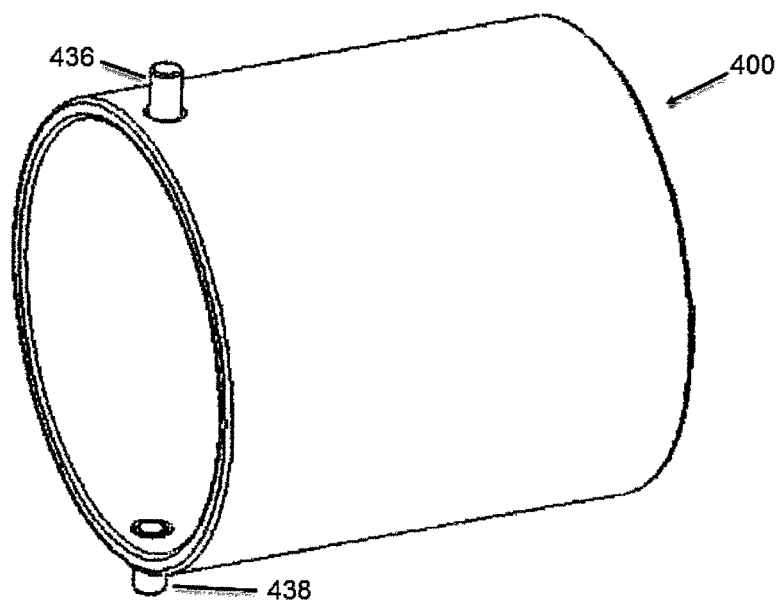
FIG. 4 is a perspective view of yet another alternative collar.
Figure 5:
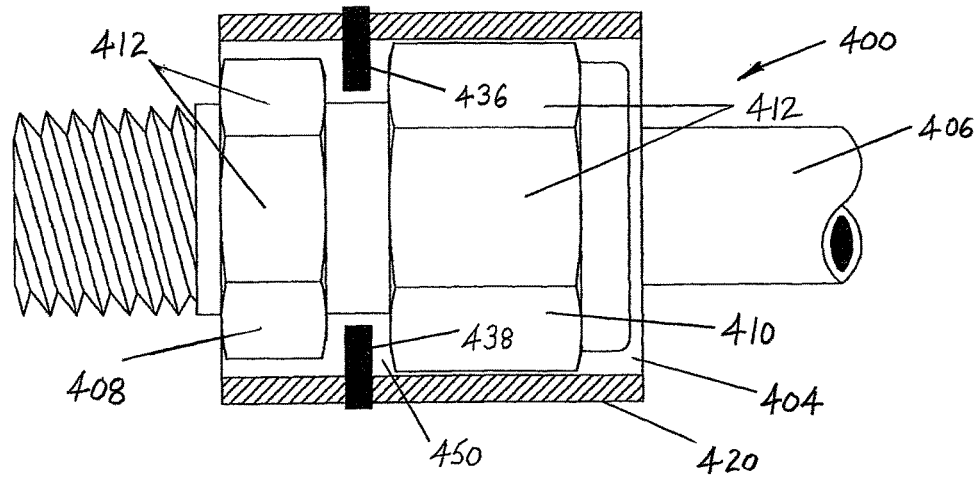
FIG. 5 is an elevational view, shown partially in cross-section, of a collar received on a fitting assembly.

A slightly modified version of a collar 400 is shown in FIGS. 4 and 5. Here, there are no individual tabs to form the holding mechanism 430, rather the end of the collar 400 that is initially received at least partially over the fitting assembly 402 is uninterrupted and circumferentially continuous. The holding mechanism 430 defined by one or more pins 436, 438 that prevent inadvertent removal of the collar 400 from the fitting assembly 402 once the collar has been axially advanced over the nut 410, and perhaps over the tool flats of the body 408 of the fitting assembly (FIG. 5). Specifically, the pins 436, 438 are pressed or advanced radially inwardly into the gap axially located between the nut 410 and the body 408 of the fitting assembly 402. Again, the collar 400 has an axial dimension whereby the other end of the collar is substantially flush with the face of the nut 110 opposite from the tube fitting body 408. It will also be appreciated that a greater or lesser number of pins 436, 438 could be used, or the circumferential spacing of the pins about the collar 400 may be varied without departing from the scope and intent of the present disclosure, although it will be recognized that the dimension of the pin(s) must be sufficient to extend into the radial gap 450 between nut and body, and be sufficient to axially interfere/engage the lesser dimensioned portion of the fitting assembly if the nut and body have different dimensions as shown in FIG. 5.

The pins 436, 438 in the embodiment of FIG. 5 extend radially inward a substantial extent, almost into bottomed out engagement with the fitting when the pins are pressed flush with the outer surface of the collar 400. This configuration and radial inward extension of the pins 436, 438 makes the collar more difficult to remove once installed on the fitting assembly.

Figure 6:
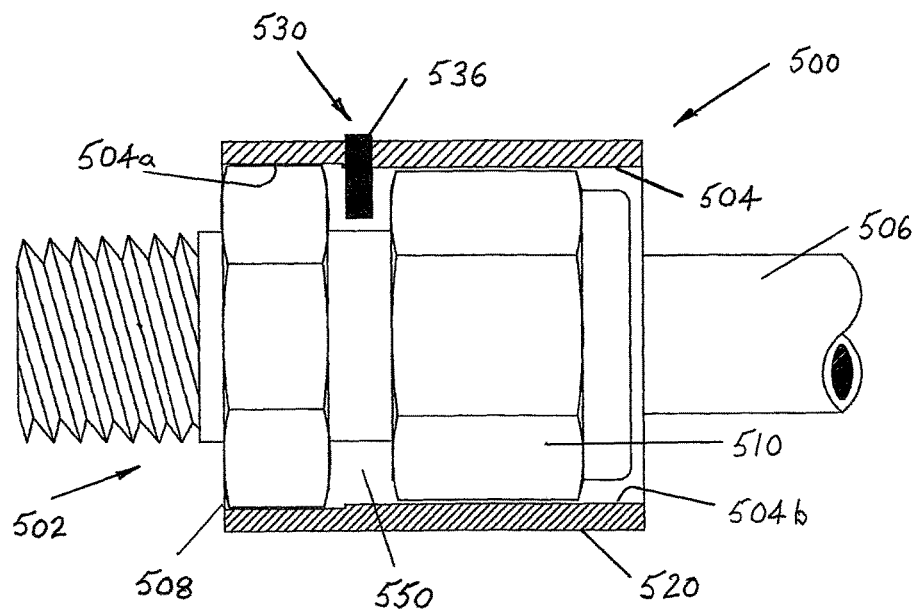
FIG. 6 is an elevational view, shown partially in cross-section, of a collar received on a fitting assembly that includes an enlarged tube fitting body.

In FIG. 6, where body 508 of the fitting assembly 502 has a slightly larger dimension than the corresponding nut 510, the inner surface 504 of the collar 500 may have a stepped configuration. Specifically, the inner surface 504 includes a larger diameter, first portion 504a and a smaller diameter, second portion 504b. Stated another way, the collar 500 has different wall thicknesses in these portions. In the modified arrangement of FIG. 6, however, the collar extends over a larger portion of the fitting assembly when installed in place, i.e., over both the body 508 and the nut 510 of the fitting assembly 502. In contrast to the pins 436, 438 of FIG. 5, the pin(s) 536 in the embodiment of FIG. 6 does not protrude radially inward to the same extent when the outer end of the pin is brought flush with the outer surface of the collar 500. As a result, the pin 536 is nowhere near bottomed out, and it is contemplated that the pin can be pressed radially inward even further with a special tool and entirely into the cavity 550 if there is a need or reason to allow the collar 500 to be easily removed. Of course, the collar 500 and pin(s) 536 can be easily reinstalled if necessary.

Figure 7:
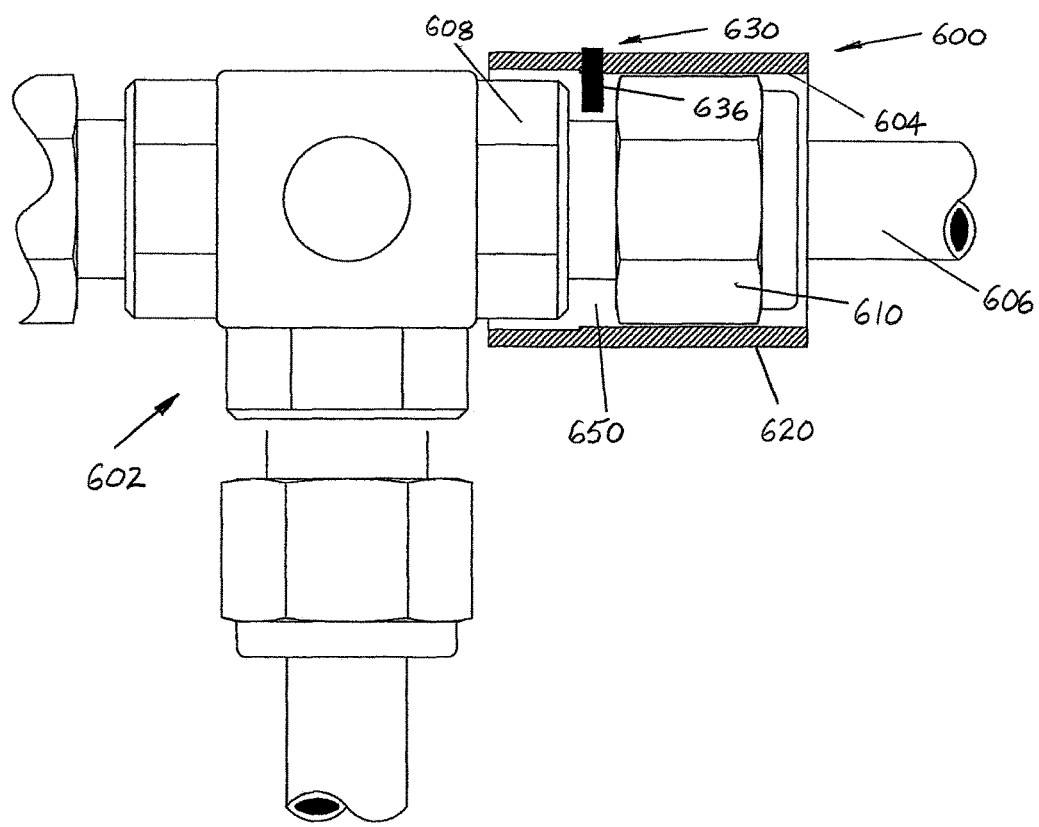
FIG. 7 is an elevational view, shown partially in cross-section, of a collar received on a tee fitting assembly.

FIG. 7 illustrates the adaptation of collar 600 to different fitting styles. Shown here is a tee fitting assembly 602 where the collar 600 is received over the nut 610 and over a portion of the hex style body 608 of a forged elbow or tee assembly. In substantially other respects, the collar 600 is still assembled over at least a portion of the fitting assembly 602 in a manner as described above.

Figure 8:
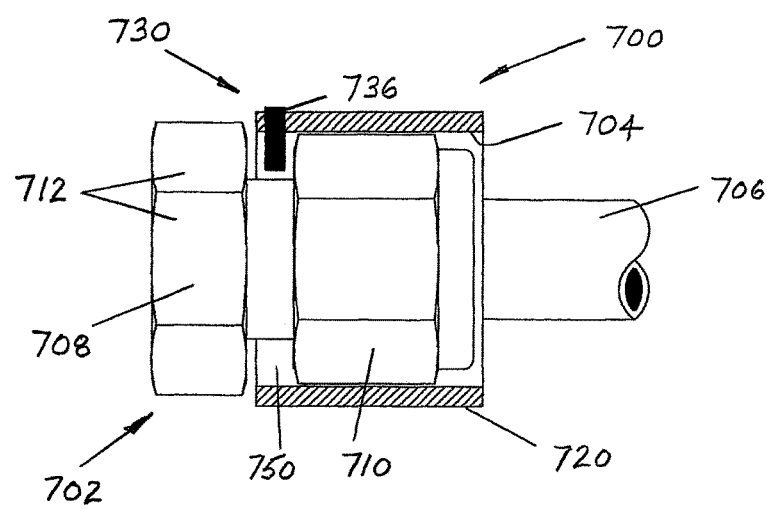
FIG. 8 is an elevational view, shown partially in cross-section, of a collar that is received over the nut only of a fitting assembly.

FIG. 8 illustrates yet another situation in which the body 708 of the fitting assembly 702 has tool flats 712 of a larger dimension than the tool flats 712 of the corresponding nut 710. Consequently, the collar 700 is dimensioned for receipt over the nut 710 only of the fitting assembly 702. However, the collar 700 has a sufficient axial length to still encompass the nut 710, and the radially inward extending tab or pin 736 prohibits axial removal of the collar 700 therefrom.

In summary, the tamper-resistant, tube fitting collar may be a pressed-in, heat-treated, or soft plastic pin, depending upon how secure the connection needs to be. The collar could also be a snap ring, a spring wire, an internal mechanism, or a springable stamped detent.

The collar can be easily positioned by sliding the collar on to the fitting or fitting assembly until an end of the collar is flush with an end face of a nut of the fitting. A holding mechanism such as a tab or pin can then be pressed into place using a simple wrench such as a vise grip, channel lock, or regular pliers, for example. If the holding mechanism is a snap ring or wire type retainer, the holding mechanism will automatically snap into place when the collar is positioned properly.

The collar can be re-used and removed if so desired by using a soft, easy to machine plastic or soft metal pin.

Depending on the required safety requirements, several different types of collars can be used ranging from a simple snap ring design to a pressed pin design. Some of the tamper-resistant designs may be adapted for installer removal which requires a special, limited, owner use tool. The more robust proof resistant design cannot be easily removed for a more secure connection.

The collar can be made from metal, either investment cast, stamped, or machined. Alternatively, the collar can be made from plastic, either molded or machined. The pin can be made from either metal or plastic depending upon customer requirements.

In one preferred arrangement, a slip on collar encapsulates a fitting nut and body, or just a part of the fitting assembly such as the nut. The collar is placed over the fitting assembly until a first or end face of the collar is flush with a face of the nut and desirably the holding mechanism is aligned with a radial gap in the fitting assembly. A small pin (or pins) located at a proper location on the collar is used to fasten the collar to the fitting assembly simply by pressing the pin radially inwardly into the radial gap relative to the collar with an appropriate tool, such as a standard vice grip or channel lock type pliers. The pin(s) is (are) thereby located in the gap or space defined between the nut and body of the fitting assembly. The pin extends radially inward into the gap a dimension less than the outer surface of the nut and body and thus serves as an interference fit and prevents the slip-on collar from subsequently being axially removed over the nut and/or body. The interference fit makes it substantially impossible to loosen the fitting with a wrench unless someone intentionally destroys the collar.

If it is desired that the collar be reused, and likewise be less secure than other embodiments, it becomes necessary to replace the pressed-in, heat treated pin with a soft metal pin with a center opening or hole that can be easily drilled out for removal, or a plastic pin, or a threaded screw.

Another preferred arrangement of the tamper-resistant tube fitting collar provides a collar that slips on or over to encapsulate the nut and/or body of the fitting assembly. The collar is placed over the fitting until the end face of the collar is flush with the face of the nut. A special groove and holes are designed on the outside of the collar so that a specially designed snap ring is inserted to locate and lock the collar in place, thereby preventing a wrench from being used to loosen the fitting. When assembled, the snap ring is received in the gap between the nut and body and extends radially inward into the gap by a radial dimension less than the outer surfaces of the nut and body of the fitting assembly to prevent the slip on collar from being easily removed in an axial direction over the nut or body. The design of the snap ring and groove are such that the collar is difficult to remove and will discourage one from simply using a wrench to loosen the fitting.

An alternative to the snap ring is to have the collar stamped with multiple fingers pointing down that will snap into position when the collar is located properly on the fitting. This type of collar requires some force to open the fingers allowing the collar to slide over the nut to position the collar in place.

A light press slip-on collar encapsulates the fitting nut and body, and is placed over the fitting using a special tool or by lightly tapping with a suitable device until the collar face is flush with the nut face. A special groove on the inside of the collar holds a spring-type device such as a snap ring or spring wire that will snap into the gap between the nut and body of the fitting once installed, the collar is now a slip fit on the tube fitting. The design of the snap-ring or spring wire prevents the now loose collar from being removed and will discourage one from simply using a wrench to loosen the fitting.

Depending on the installation safety requirements, the collar can be made from any suitable material including heat-treated steals certain types of stainless steels. Further, collar can be suitably marked for custom installation and/or instruction.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. A tamper evident assembly for an associated fluid fitting having a threaded nut that cooperates with a threaded body; the tamper evident assembly comprising:
   a collar having an external surface without tool engaging surfaces, and inner surface dimensioned to be no less than an outermost dimensioned extent of the associated threaded nut and dimensioned for receipt over at least one of the nut and body of the associated fluid fitting; and
   a non-threaded holding mechanism operatively associated with the collar for movement between (i) a first position that extends radially inward a dimension no less than a through opening, and (ii) a second position extending radially inward that prevents axial removal of the collar over both of the nut and body of the associated fluid fitting, wherein the holding mechanism includes at least one pin that is movably mounted to the collar, extends radially outward from the collar in the first position, extends radially inward from the collar in the second position, and a first end of the at least one pin is flush with an outer surface of the collar in the second position.

2. The tamper evident assembly of claim 1 wherein the at least one pin is dimensioned for receipt in a radial gap located between a body and a nut of a fitting assembly in the second position.

3. The tamper evident assembly of claim 1 wherein the at least one pin is spaced axially inward from an end of the collar.

4. The tamper evident assembly of claim 1 wherein the collar has an inner surface dimensioned for receipt over only a portion of the fitting assembly.

5. The tamper evident assembly of claim 4 wherein the collar has a stepped inner surface.

6. A tamper evident assembly for an associated fluid fitting having a threaded nut that cooperates with a threaded body; the tamper evident assembly comprising:
   a collar having an external surface without tool engaging surfaces, and inner surface dimensioned to be no less than an outermost dimensioned extent of the associated threaded nut and dimensioned for receipt over at least one of the nut and body of the associated fluid fitting; and
   a non-threaded holding mechanism operatively associated with the collar for movement between (i) a first position that extends radially inward a dimension no less than a through opening, and (ii) a second position extending radially inward that prevents axial removal of the collar over both of the nut and body of the associated fluid fitting, wherein the holding mechanism includes at least one tab that extends axially outward from an end of the collar, and wherein at least one pin extends through the at least one tab for radial movement from the first position to the second position.

7. The tamper evident assembly of claim 6 wherein the pin extends radially outward from the collar in the first position, and extends radially inward from the collar in the second position.

8. The tamper evident assembly of claim 7 wherein the pin is movably mounted to the collar.

9. The tamper evident assembly of claim 8 wherein a first end of the pin is flush with an outer surface of the collar in the second position.

10. The tamper evident assembly of claim 6 wherein the at least one pin is spaced axially inward from an end of the collar.

11. The tamper evident assembly of claim 6 wherein the collar has an inner surface dimensioned for receipt over only a portion of the fitting assembly.

12. The tamper evident assembly of claim 6 wherein the collar has a stepped inner surface.

* * * * *